C. E. FRUDDEN.
CHANGE GEAR DEVICE.
APPLICATION FILED MAY 24, 1918.
1,348,935.
Patented Aug. 10, 1920.
3 SHEETS—SHEET 1.
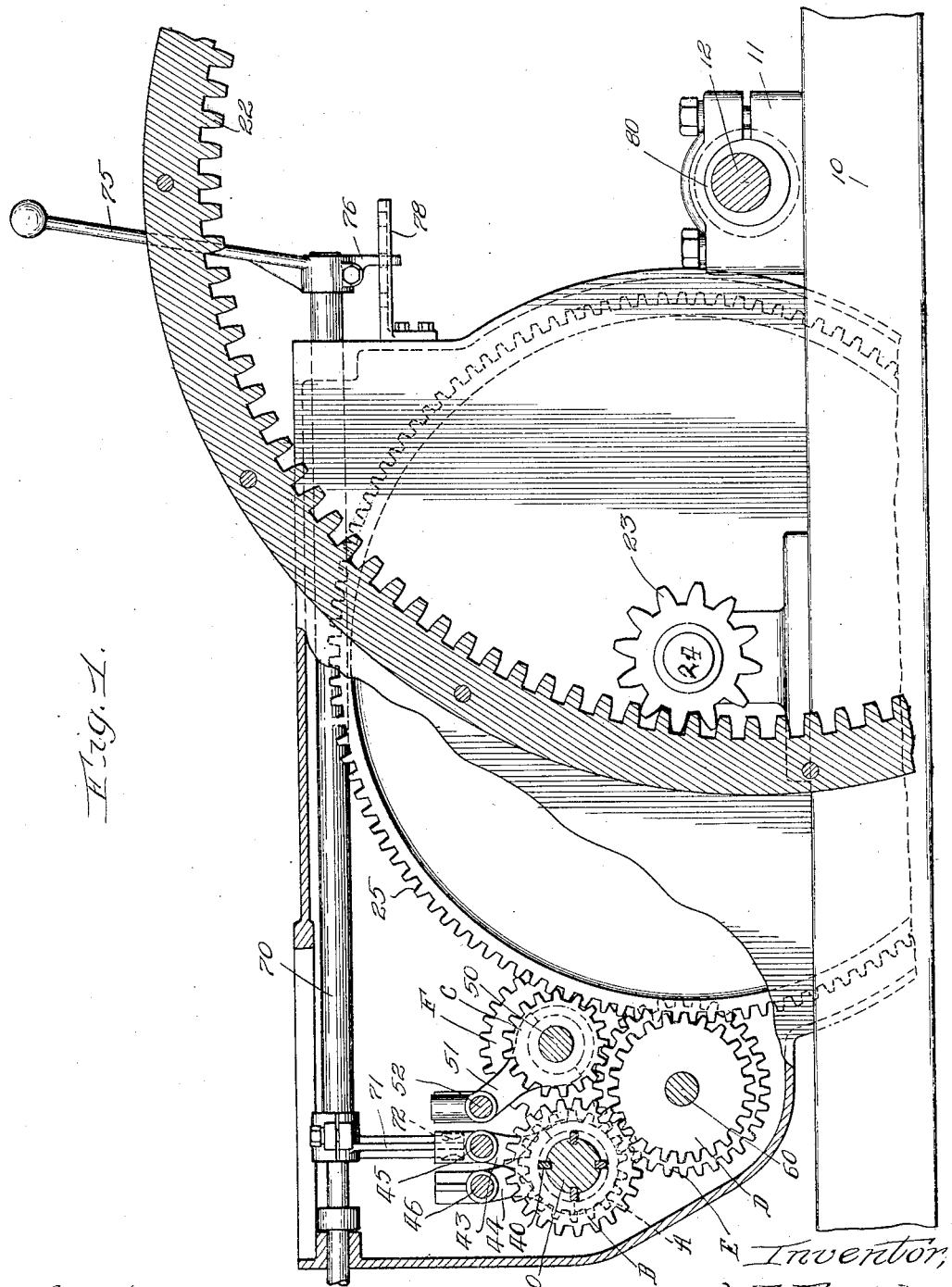
Witness:
R. L. Farrington
Inventor,
Conrad E. Frudden
By Hirschl, Hirschl & Brooks
Attys.

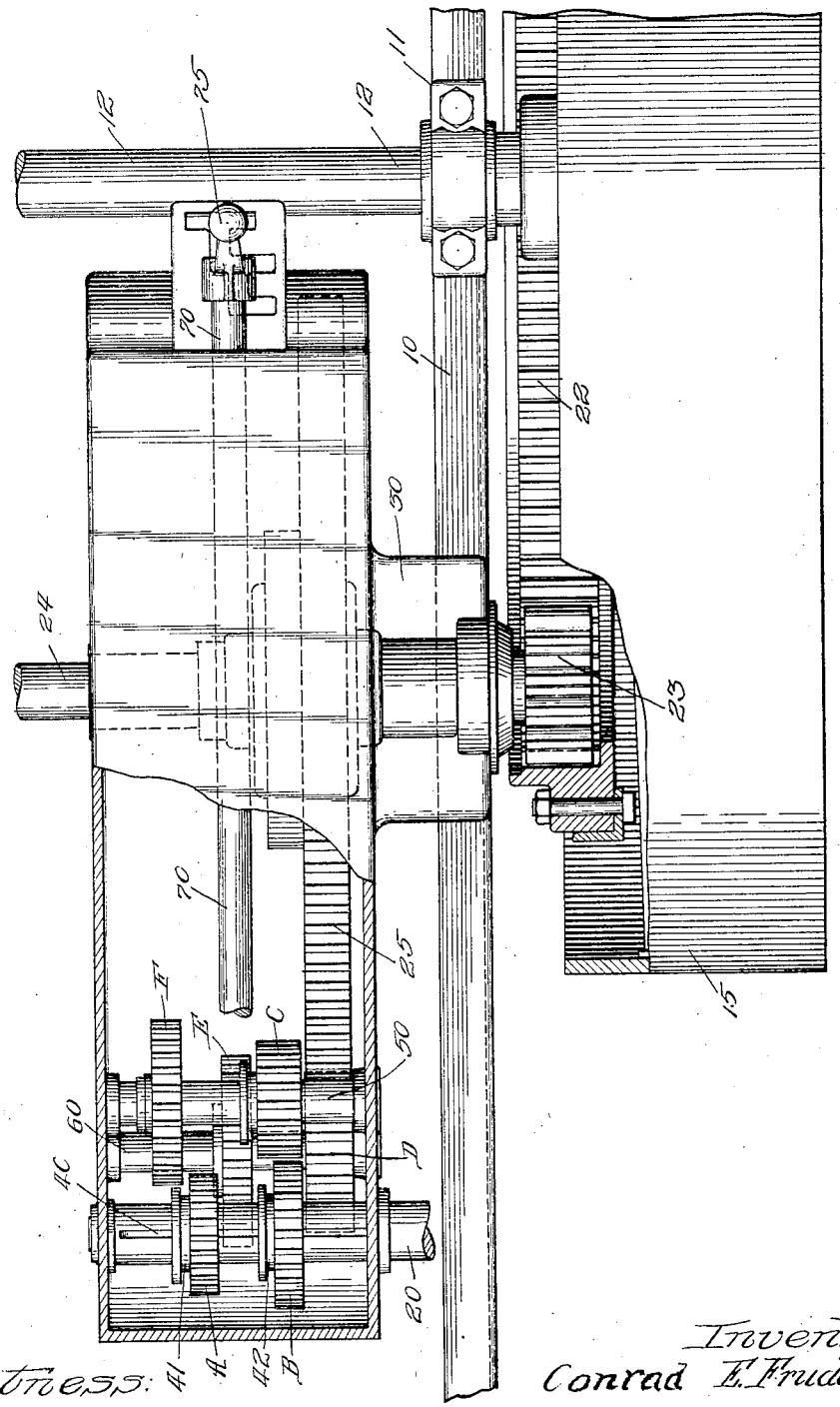

C. E. FRUDDEN.
CHANGE GEAR DEVICE.
APPLICATION FILED MAY 24, 1918.
1,348,935.
Patented Aug. 10, 1920.
3 SHEETS—SHEET 3.
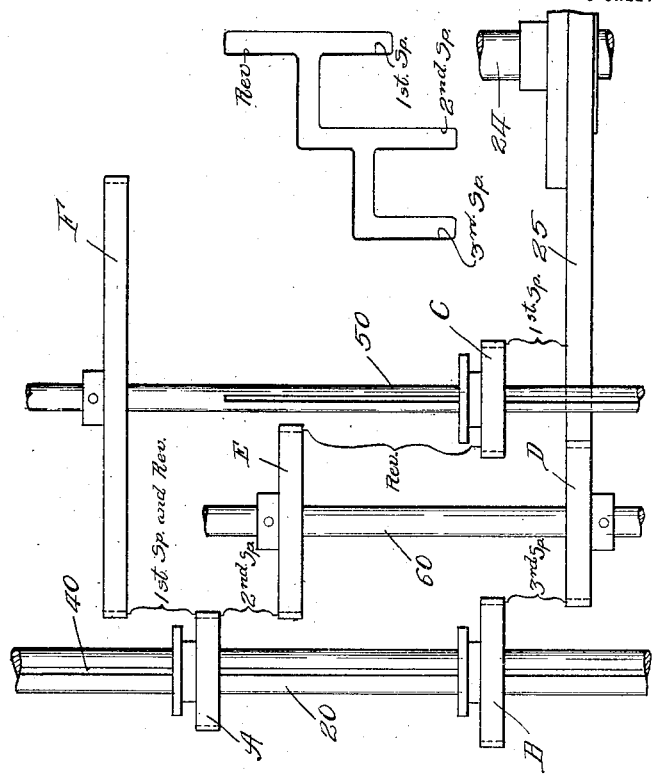
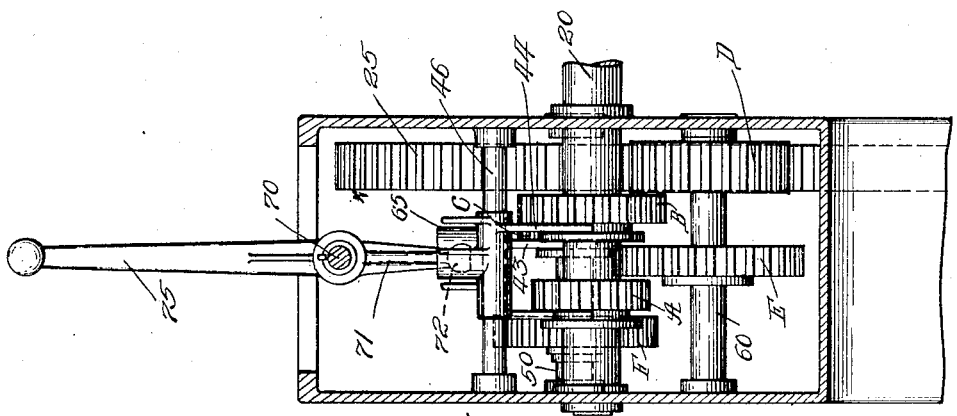
Witness:
R. L. Farrington
Inventor,
Conrad E. Frudden
By Hischl, Hischl & Brooks,
Attys.

UNITED STATES PATENT OFFICE.

CONRAD E. FRUDDEN, OF CHICAGO, ILLINOIS, ASSIGNOR TO PARRETT TRACTOR COMPANY, OF CHICAGO, ILLINOIS, A CORPORATION OF DELAWARE.

CHANGE-GEAR DEVICE.

1,348,935.  Specification of Letters Patent.  Patented Aug. 10, 1920.

Application filed May 24, 1918. Serial No. 236,340.

*To all whom it may concern:*

Be it known that I, CONRAD E. FRUDDEN, a citizen of the United States, residing in Chicago, county of Cook, State of Illinois, have invented certain new and useful Improvements in Change-Gear Devices, of which the following is a specification.

This invention relates to improvements in change-gear devices, and more especially to the type of change-gear device or mechanism commonly employed in automobiles, motor-trucks, tractors and similar machinery, employing internal combustion engines for power, wherein it is necessary to provide a variable gear ratio between the engine and the driving wheels. Among the requirements of such a device are that it shall be as light and strong as possible and simple in its construction and maintenance, efficient in its power transmission and easy to operate. As is well-known various arrangements of gears and pinions are employed for the purpose, a common expedient being to arrange sets of gears on parallel shafts and provide means for shifting them into and out of mesh, this form of device being known as a sliding-gear set and in common use. One of the objects of this invention is to provide such a device, designed to provide several combinations of gear for driving a motor vehicle ahead and a reverse gear combination, with the gears so arranged that they are as compact as possible, requiring a minimum amount of sliding movement of any one of them, so that their shafts may be as short and, therefore, rigid as possible; and to provide also for the driving through each gear combination with a minimum number of gears and pinions in mesh, thereby providing the advantages of a "direct drive" as it is known for all of the combinations ahead instead of driving through intermediate sets of gears and pinions as is a common expedient.

A change-gear mechanism embodying the principles of this invention is illustrated in the accompanying drawings in which:

Figure 1 is a radial section through all of the gear shafts, showing the gears and pinions as viewed from all their sides or faces.

Fig. 2 is a top plan view showing the complete mechanism.

Fig. 3 is a view showing the gears and shafts in side elevation.

Fig. 4 is a diagrammatical view showing the arrangement of the gears and pinions for the various change speed combinations.

As shown in said drawings 10 indicates a part of the frame of a tractor or similar motor vehicle, the same being suspended through a journal member 11 from the axle 12 of the vehicle, which latter rests on a large driving wheel or traction wheel 15. The machine is propelled by an internal combustion engine transmitting its power to a driving shaft 20, these parts being here shown as arranged in actual practice but their particular design and construction not constituting any necessary part of the invention; and likewise the particular design of the engine and the means for coupling it to the shaft 20 are not involved in this invention and not here shown.

The driving wheel 15 carries a large internal gear 22 in constant mesh with a driving pinion 23 fixed on a cross shaft 24; and on the shaft 24 is also arranged a large gear 25 which drives the shaft through a "differential gear" mechanism 30 in its hub. The shaft is continued through the differential gear and carries at its other end a pinion corresponding to the pinion 23 for driving a similar traction wheel on the other side of the machine, the differential gear permitting the traction wheels to run at unequal speeds in turning corners, as is well-known.

Between the driving shaft 20 and the gear 25 which drives the traction wheels through the differential mechanism, as above described, is the change-gear mechanism comprising parts as follows:

The shaft 20 carries a small pinion A and a somewhat larger pinion B, both of these being free to slide endwise on the shaft but non-rotative with respect thereto; the shaft being provided with splines or feathers 40 engaging in corresponding grooves in the hubs of the pinions, according to approved practice, to prevent the latter from rotating on the shaft. The hub of each pinion is made also wide enough to provide a radial groove, 41, 42, respectively, and in these grooves are engaged shifting forks 43 and 44 respectively. The fork 43, which shifts the pinion A, slides on a shaft 45 above the shaft 20, and the fork 44, which shifts the pinion B, slides on a similar shaft 46 parallel to the first; the two shafts 45 and 46 being arranged side by side as shown. Beside the shaft 20 and between it and the shaft 24 is a parallel counter-shaft 50 on which is arranged a sliding pinion C similarly provided with a grooved hub for engagement by a shifting fork 51 the latter sliding endwise on a shaft 52, parallel to the shafts 45 and 46. The three shifting fork-shafts are arranged side by side with the shaft 45, which guides the fork for the pinion A, in the middle.

Below the two shafts 20 and 50 is another countershaft 60 to which there is fixed a pinion D in constant mesh with the large gear 25 and of such diameter that the pinion B may also be meshed and unmeshed with it in the sliding movement of such pinion. The shaft 60 also carries a fixed pinion E, similarly adapted for meshing and unmeshing with the pinion A in the sliding movement of the latter, and on the shaft 50 there is also a fixed pinion F with which the pinion A may be meshed in its movement in the opposite direction from that which meshes it with the pinion E. The sliding movement of the pinion C is adapted to mesh and unmesh it with the large gear 25.

Made integral with the hub part of each of the shifting forks are a pair of upwardly projecting flanges providing between them a deep notch or groove 65 (Fig. 3), and above the gears there is a long transverse shaft 70 which is arranged to slide endwise in its bearings and carries a downwardly projecting crank arm or "shifting finger" 71 having at its lower end a rounded enlargement 72 adapted to engage in the grooves 65, so that by sliding the shaft endwise and rotating it through a small angle the end of the arm 71 may be engaged with any one of the shifting forks and the corresponding pinion A, B, or C shifted on its shaft, as is understood by those familiar with the art. To the other end of the shaft 70 is fixed a long hand lever 75 which is guided at its lower end 76 in a slotted plate 78; the lever in its rocking movement back and forth and its endwise sliding movement following the directions of the slots for the proper engagement and disengagement of the three shifting forks and the shifting of the corresponding pinions. For this purpose the parts are so arranged that when the gears are in their neutral position as here shown, with the pinions A, B, and C all unmeshed, the notches 65 of the two shifting forks 43 and 44 are side by side so that the shifting finger 71 may pick up either of them, but the shifting fork 51 is in offset relation to the other two so that the finger 71 can not pick it up without first shifting the pinion A out of its neutral position. Correspondingly the guide plate 78 is slotted as shown in Fig. 4 where it will be seen that through one of the change-gear combinations the hand lever 75 may be moved to the left, as viewed in Fig. 1, to pick up the shifting fork 44 and then rotated to mesh the pinion B with the pinion D. This provides the highest speed gear combination or "third speed" and in this combination the end of the hand lever enters and travels to the end of the corresponding slot in the guide plate 78 marked "Third speed". For the next gear combination the lever 75 is brought back to its upright position to unmesh the pinion B, is shifted to engage the middle shifting fork 43, and is then rotated in the same direction to mesh the pinion A with the pinion E; this position of the parts being permitted by the slot in the guide plate marked "Second speed", which is parallel to the first slot and extends in the same direction. The pinion A may be similarly unmeshed by bringing the lever 75 back to its upright position, and with its end in the same slot the lever may be rotated past its upright position and in the opposite direction to mesh the pinion A with the pinion F. The relation of the parts is such that when these latter two pinions are thus meshed the shifting finger 71 comes opposite the notch in the shifting fork 51 and the hand lever may then be moved sidewise to pick up the third fork and shift the pinion C without unmeshing the pinions A and F. Shifting the pinion C in one direction to mesh it with the gear 25 provides the "first speed" or lowest gear combination ahead, as indicated at the end of the third slot in the guide plate 78, and shifting the pinion in the opposite direction meshes it with the pinion E to provide the reverse gear combination, it being noted that the three slots in the guide plate are so arranged that the middle point or neutral point in the third slot is opposite one end of the middle slot, thus permitting the shifting lever to mesh the pinion A and then to pick up the pinion C and mesh it in either the first speed or the reverse gear combination without unmeshing the pinion A; so that in shifting the gears from the third speed or the second speed down to the first speed or the reverse, two pinions are meshed in one operation; and in shifting up to a higher gear combination from the first speed or the reverse, two pinions are taken out of mesh in one operation.

As a further and additional improvement there is interposed between the axle 12 of the machine and the journal member 11 an eccentric bushing 80 which may be adjustably rotated to vary the distance between centers of the pinions 23 and internal gears 22 and provide for changing the gear ratio of these parts by substituting pinions larger or smaller in diameter than those here shown.

I claim as my invention:

1. In a change-gear device the combination of a driving shaft and a driven shaft carrying a driven gear, a counter-shaft interposed between the driving shaft and the driven shaft, a sliding pinion on the driving shaft, a fixed and a sliding pinion on the counter-shaft, and means for meshing the first sliding pinion with the fixed pinion and for meshing the second sliding pinion with the driven gear at a single operation.

2. In a change-gear device, the combination of two parallel shafts having thereon sliding pinions in non-rotative relation to the shafts, an intermediate shaft with fixed gears thereon adapted for meshing with the sliding pinions, shifting forks for controlling the movements of the sliding pinions, and a laterally movable, oscillating shifting finger adapted to engage the shifting forks, the position of the shifting forks with the gears unmeshed being in off-set relation to each other, whereby the shifting finger may engage one fork through a movement of the other fork.

3. In a change-gear device, the combination of shafts and sliding pinions, an intermediate shaft with gears thereon adapted to be meshed by said sliding pinions, a hand lever adapted to impart movement to the sliding pinions, and a slotted guide plate for controlling the movements of the hand lever according to the meshed and unmeshed positions of the pinions in the various gear combinations and their neutral position, the guide plate having three parallel slots with connecting slots between them and the center of one slot being opposite the end of the other.

4. In a change-gear device the combination of two parallel shafts having relatively non-rotative pinions sliding thereon, gears adapted for meshing with the pinions in their sliding movement, shifting forks for imparting sliding movement to the pinions, openings in the shifting forks and a shifting finger adapted to engage in the openings and to impart movement to the shifting forks, the shifting forks being arranged, in the unmeshed positions of the pinions, in off-set relation to each other, whereby the shifting finger may engage one fork after moving the other fork into a position to mesh its pinion.

5. In a change-gear device the combination with two shafts having sliding pinions thereon in non-rotative relation thereto, shifting forks for imparting sliding movement to the pinions, openings in the shifting forks and a shifting finger adapted for engagement in the openings to impart movement to the forks, of a hand lever controlling the movement of the shifting finger and a guide plate controlling the movement of the hand lever, the guide plate having two parallel slots permitting an oscillating movement of the hand lever in two parallel planes, the position of the hand lever in the center of the first slot providing an unmeshed position of one of the sliding pinions and its position at an end of either slot providing a meshed position of the corresponding pinion, and the center of one slot being opposite an end of the other.

6. In a change-gear device the combination with a driving shaft and a driven shaft carrying a driven gear of a sliding pinion on the driving shaft in non-rotative relation thereto, two shafts interposed between the driving shaft and the driven shaft, one of the interposed shafts carrying a fixed pinion and another fixed pinion in constant mesh with the gear on the driven shaft, a fixed pinion on the second interposed shaft and a sliding pinion on the same shaft in non-rotative relation thereto; and means for meshing the sliding pinion on the driving shaft with the fixed pinion on either interposed shaft with the sliding pinion on the second interposed shaft in its unmeshed position; and for meshing the sliding pinion on the driving shaft with the fixed pinion on the second interposed shaft, and with it thus in mesh, meshing and sliding pinion on the second interposed shaft with either the driven gear or with the fixed pinion on the first interposed shaft.

In witness whereof, I have subscribed my name this 20th day of May, 1918.

CONRAD E. FRUDDEN.